Patented Jan. 4, 1949

2,458,485

UNITED STATES PATENT OFFICE 2,458,485

PROCESS OF PREPARING 4-SUBSTITUTED-ar-TETRAHYDRO-2-NAPHTHOLS

Curt G. Vogt, Union, N. J., and Joseph M. Wilkinson, Jr., Easton, Pa., assignors to General Aniline & Film Corporation, New York, N. Y., a corporation of Delaware No Drawing. Application September 6, 1946, Serial No. 695,283

7 Claims. (Cl. 260—575)

The present invention relates to new ar-tetrahydro-β-naphthols and to a process of preparing the same.

The preparation of certain nitro and amino derivatives of ar-tetrahydro-2-naphthol has been described in Annalen, 426, 83-160 (1921). According to the process there described ar-tetrahydro-2-naphthol is sulfonated with the introduction of two sulfonic acid groups into the aryl ring which on subsequent nitration are replaced by nitro groups. In this procedure the sulfonic acid groups enter into positions ortho to the hydroxyl group with the consequence that only the 1,3-dinitro-ar-tetrahydro-2-naphthol is obtained. The 1-nitro-3-amino- and the 1,3-diamino-ar-tetrahydro-2-naphthols are obtained from the dinitro derivative by reduction with stannous chloride and hydrochloric acid in an inert solvent.

We have now found that 1-amino-ar-tetrahydro-2-naphthols which contain a univalent substituent in 4-position and have the general formula:

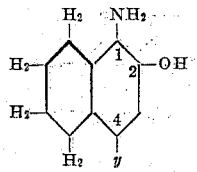

can be obtained by the hydrolysis of 4-substituted-ar-tetrahydro-β-naphthoxazolones of the general formula:

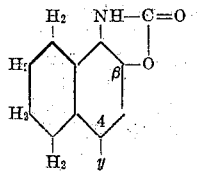

wherein $y$ represents a nitro, amino, hydroxy, cyano, thiocyano or sulfonic acid group or a halogen atom which may be chlorine, bromine, fluorine or iodine. These ar-tetrahydro-β-naphthoxazolone compounds are described and claimed in our copending application Ser. No. 695,282 filed September 6, 1946. They may be prepared by starting with ar-tetrahydro-β-naphthoxazolone from which by nitration with nitric acid in glacial acetic acid the 4-nitro derivative is obtained. The 4-amino derivative is derived from the 4-nitro derivative by reduction with hydrogen in the presence of a catalyst such as platinum oxide-platinum black.

The 4-sulfonic acid derivative of ar-tetrahydro-β-naphthoxazolone may be prepared by the low temperature sulfonation of ar-tetrahydro-β-naphthoxazolone using fuming sulfuric acid.

The remaining 4-derivatives of ar-tetrahydro-β-naphthoxazolone may be obtained from the 4-amino-ar-tetrahydro-β-naphthoxazolone through the formation of a 4-diazonium salt of suitable salt group and treatment of the selected 4-diazonium salt to replace the diazo group with the desired univalent substituent. The procedures involved in the preparation of these other 4-derivatives are known, including the formation of the diazonium salts; choice of procedures for the replacement of the diazo group obviously being dependent upon the character of the substituent which it is desired to introduce into the 4-position of the naphthoxazolone molecule.

The 4-chloro-derivative of ar-tetrahydro-β-naphthoxazolone is prepared following the Sandmeyer reaction by heating the 4-diazonium chloride of ar-tetrahydro-β-naphthoxazolone with an equimolar quantity of cuprous chloride in an excess of concentrated hydrochloric acid. The 4-bromo derivative is prepared in like manner using the corresponding 4-diazonium bromide with cuprous bromide in concentrated hydrobromic acid. In place of the diazonium bromide, the 4-diazonium sulfate may be used. The 4-fluoro derivative is obtained by thermally decomposing the 4-diazonium borofluoride of ar-tetrahydro-β-naphthoxazolone and the 4-iodo derivative by warming an aqueous solution of the corresponding diazonium chloride with a mixture of iodine and potassium iodide.

Similarly, the 4-cyano derivative may be prepared by warming the solution of the corresponding diazonium halide with the mol equivalent of potassium cuprous cyanide [K₃Cu(CN)₄] and the 4-thiocyano derivative likewise, employing in place of the potassium cuprous cyanide an equimolar mixture of potassium thiocyanate and cuprous thiocyanate.

The 4-hydroxy derivative is obtained when the solution of the corresponding diazonium salt is heated with dilute aqueous sulfuric acid.

The new ar-tetrahydro-β-naphthols are useful as intermediates in the preparation of dyestuffs, textile auxiliaries, pest control agents, pharmaceuticals, etc.

According to the present invention, the 1-amino-4-substituted-ar-tetrahydro-β-napthols of the above general formula are obtained by hydrolyzing the aforedefined corresponding 4-substituted-ar-tetrahydro-β-naphthoxazolones using a dilute aqueous alkaline or mineral acid medium as the hydrolyzing agent. The reaction is carried out by gently heating the mixture, generally at reflux temperatures, and preferably in an atmosphere of an inert gas such as nitrogen or carbon dioxide and the like. Examples of hydrolyzing agents which may be used include dilute aqueous solutions or suspensions of alkaline compounds such as alkali metal hydroxides and carbonates, e. g., sodium hydroxide, potassium hydroxide, sodium carbonate and potassium carbonate, alkaline earth oxides and hydroxides, e. g., calcium oxide and calcium hydroxide, and dilute aqueous solutions of mineral acids such as hydrochloric acid, sulfuric acid and phosphoric acid.

The 1-amino-4-substituted-ar-tetrahydro-β-naphthols are isolated from the reaction mixture through neutralizing of the solution with an acidic or alkaline agent according as an alkaline or acid hydrolyzing agent has been employed, the product being precipitated. Where the hydrolyzing agent is an alkaline earth compound, the product can be conveniently isolated through addition to the reaction mixture of sufficient soluble alkali metal carbonate to convert the alkaline earth compound to the insoluble alkaline earth carbonate, removal of the insoluble carbonate and neutralizing of the alkaline solution to precipitate the product. This procedure for the separation of the product is illustrated in greater detail in the specific examples which follow.

The invention is further illustrated by the following specific examples to which, however, it is not intended that it be limited. Parts are by weight.

EXAMPLE 1

*1-amino-4-nitro-ar-tetrahydro-2-naphthol*

A solution of 15 parts of 4-nitro-ar-tetrahydro-β-naphthoxazolone of the formula:

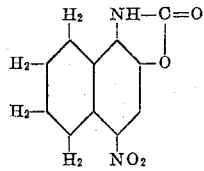

in 300 parts of water containing a suspension of 15 parts of hydrated lime was heated under gentle reflux in an atmosphere of nitrogen for 20 hours. To the hot solution was added 20 parts of sodium carbonate and the mixture heated at reflux for an additional 1½ hours. The precipitated calcium carbonate was separated by filtration, the filtrate acidified with concentrated hydrochloric acid, heated to boiling, decolorized with charcoal and filtered. The solution was neutralized by the addition of sodium acetate and cooled. The product was removed by filtration, washed with water and dried. Recrystallization from dilute ethyl alcohol gave orange-red needles melting at 188° C.

EXAMPLE 2

*1-amino-4-chloro-ar-tetrahydro-2-naphthol*

A mixture of 15 parts of 4-chloro-ar-tetrahydro-β-naphthoxazolone, 15 parts of hydrated lime and 300 parts of water was heated under reflux in an atmosphere of nitrogen for 16 hours. To the hot solution was then added 20 parts of sodium carbonate and the mixture heated under reflux for an additional 1½ hours. The precipitated calcium carbonate was separated by filtration and the filtrate neutralized with concentrated hydrochloric acid. The product was removed by filtration, washed with water and dried. Recrystallization from dilute ethanol gave white platelets melting at 167–168° C.

Following the method of the specific examples, the 1-amino-4-bromo-, 1-amino-4-fluoro-, 1-amino-4-iodo-, 1-amino-4-hydroxy-, 1-amino-4-cyano-, 1-amino-4-thiocyano-, 1-amino-4-sulfonic acid and the 1,4-diamino-ar-tetrahydro-2-naphthols can be prepared by hydrolyzing the corresponding 4-substituted-ar-tetrahydro-β-naphthoxazolones.

As various other embodiments of the invention will occur to those skilled in the art, it is not intended that the scope of the patent be limited except as is required by the prior art and the appended claims.

We claim:

1. A process of preparing 1-amino-4-substituted-ar-tetrahydro-2-naphthols which comprises hydrolyzing a 4-substituted-ar-tetrahydro-β-naphthoxazolone of the general formula:

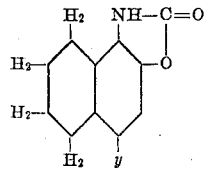

wherein y is a radical selected from the group consisting of the nitro, amino, halogen, hydroxy, cyano, thiocyano and sulfonic acid radicals, by heating in the presence of an aqueous suspension of hydrated lime.

2. The process of claim 1, wherein the hydrolysis is carried out in an atmosphere of an inert gas.

3. The process of claim 1 wherein the hydrolysis is carried out in an atmosphere of nitrogen.

4. A process of preparing 1-amino-4-nitro-ar-tetrahydro-2-naphthol which comprises hydrolyzing 4-nitro-ar-tetrahydro-β-naphthoxazolone by heating with an aqueous suspension of hydrated lime in an atmosphere of nitrogen.

5. A process of preparing 1,4-diamino-ar-tetrahydro-2-naphthol which comprises hydrolyzing 4-amino-ar-tetrahydro-β-naphthoxazolone by heating with an aqueous suspension of hydrated lime in an atmosphere of nitrogen.

6. A process of preparing a 1-amino-4-halogeno-ar-tetrahydro-2-naphthol which comprises hydrolyzing a 4-halogeno-ar-tetrahydro-β-naphthoxazolone by heating with an aqueous suspension of hydrated lime in an atmosphere of nitrogen.

7. A process of preparing 1-amino-4-chloro-ar-tetrahydro-2-naphthol which comprises hydrolyzing 4-chloro-ar-tetrahydro-β-naphthoxazolone by heating with an aqueous suspension of hydrated lime in an atmosphere of nitrogen.

CURT G. VOGT.
JOSEPH M. WILKINSON, JR.

REFERENCES CITED

The following references are of record in the file of this patent:

UNITED STATES PATENTS

| Number | Name | Date |
|---|---|---|
| 1,788,297 | Herz et al. | Jan. 6, 1931 |
| 2,041,512 | Raeck | May 19, 1936 |
| 2,104,855 | Dieterle et al. | Jan. 11, 1938 |

FOREIGN PATENTS

| Number | Country | Date |
|---|---|---|
| 458,773 | Great Britain | Dec. 28, 1936 |

OTHER REFERENCES

Schroeter et al: "Liebigs Annalen," vol. 426, pp. 83–160 (1921).

Certificate of Correction

Patent No. 2,458,485.

January 4, 1949.

CURT G. VOGT ET AL.

It is hereby certified that error appears in the printed specification of the above numbered patent requiring correction as follows:

Column 2, line 45, for "8-naphthols" read $\beta$-*naphthols*;

and that the said Letters Patent should be read with this correction therein that the same may conform to the record of the case in the Patent Office.

Signed and sealed this 27th day of September, A. D. 1949.

[SEAL]

THOMAS F. MURPHY,
*Assistant Commissioner of Patents.*